(12) United States Patent
Arakawa et al.

(10) Patent No.: US 7,326,762 B2
(45) Date of Patent: Feb. 5, 2008

(54) COPOLYMER HAVING REACTIVE SILICON-CONTAINING GROUP AND ORGANIC-INORGANIC HYBRID POLYMERIC MATERIAL

(75) Inventors: Motoomi Arakawa, Osaka (JP); Kazuaki Sukata, Yawata (JP); Masayuki Shimada, Sakai (JP); Shigehiro Sasao, Osaka (JP)

(73) Assignees: Orient Chemical Industries, Ltd., Osaka-fu (JP); Osaka Municipal Government, Osaka-fu (JP)

( * ) Notice: Subject to any disclaimer, the term of this patent is extended or adjusted under 35 U.S.C. 154(b) by 0 days.

(21) Appl. No.: 11/313,788

(22) Filed: Dec. 22, 2005

(65) Prior Publication Data

US 2006/0100405 A1 May 11, 2006

Related U.S. Application Data

(62) Division of application No. 10/736,708, filed on Dec. 17, 2003.

(30) Foreign Application Priority Data

Dec. 17, 2002 (JP) .............................. 2002-365499

(51) Int. Cl.
*C08G 77/20* (2006.01)
(52) U.S. Cl. .................. 528/32; 526/279; 526/326; 526/329.7; 528/901
(58) Field of Classification Search ............... 526/279, 526/329.7, 326; 528/901
See application file for complete search history.

(56) References Cited

U.S. PATENT DOCUMENTS

| 3,567,497 A | 3/1971 | Plueddemann et al. |
| 5,406,641 A | 4/1995 | Bigley |
| 6,103,854 A | 8/2000 | Arakawa et al. |

FOREIGN PATENT DOCUMENTS

| DE | 19629926 A1 | 1/1997 |
| EP | 0401990 A2 | 12/1990 |
| EP | 0449613 A2 | 10/1991 |
| GB | 735405 | 8/1955 |
| GB | 2303632 | 2/1997 |

OTHER PUBLICATIONS

Odian, Principles of Polymerization, 2nd Ed., Wiley-Interscience, 1981, pp. 226-242.*
English Language Abstract for JP 03 160010 A (Jul. 10, 1991).

* cited by examiner

*Primary Examiner*—Kuo-Liang Peng
(74) *Attorney, Agent, or Firm*—Birch, Stewart, Kolasch & Birch, LLP

(57) ABSTRACT

Disclosed is a copolymer comprising a polyethylene segment which is a main chain; a reactive silicon-containing group which is a side group of the polyethylene segment; and a polycondensation segment bonded to the polyethylene segment, which is a part of the main chain together with the polyethylene segment or a side chain with respect to the polyethylene segment. There are provided a condensation polymer having many reactive silicon-containing groups with respect to one molecule and an organic-inorganic hybrid polymeric material having superior properties such as strength, heat resistance, weather resistance and chemical resistance by using the polymer.

7 Claims, 8 Drawing Sheets

COPOLYMER HAVING REACTIVE SILICON-CONTAINING GROUP AND ORGANIC-INORGANIC HYBRID POLYMERIC MATERIAL

This application is a divisional of co-pending application Ser. No. 10/736,708, filed on Dec. 17, 2003, the entire contents of which are hereby incorporated by reference and for which priority is claimed under 35 U.S.C. § 120.

BACKGROUND OF THE INVENTION

1. Field of the Invention

The present invention relates to an organic copolymer having an inorganic functional group and an organic-inorganic hybrid polymeric material prepared from the copolymer.

2. Prior Art

Plastics is superior in molding processability, productivity, light weight, flexibility, mechanical properties and electrical properties, which can substitute for existing materials such as metal, glass, wood and paper, so as to be used for manifold fields such as construction materials, structural parts and mechanical parts of electric and electronic products, exterior and interior parts of automobiles, vehicles, aircraft and ships, daily miscellaneous goods and packing materials. For this reason, there are many kinds of plastics.

With regard to the classification of plastics, they are first roughly divided into thermosetting resin and thermoplastic resin. Thermosetting resin is a resin which causes crosslinking reaction by heating a prepolymer so as to cure. Accordingly, thermosetting resin has flowability before curing and does not soften nor melt even by reheating once after curing. An example thereof involves phenolic resin, urea resin, melamine resin, unsaturated polyester, diallyl phthalate resin, epoxy resin, polyurethane, silicone resin, alkyd resin, and the like.

On the contrary, thermoplastic resin is a resin which melts by heating and solidifies by cooling. Thermoplastic resin softens and melts by reheating even after curing once, thereby being appropriately used for molding. For that reason, thermoplastic resin has been recently occupying approximately 90% of total production of plastics. This thermoplastic resin can be classified into general-purpose plastics and engineering plastics.

An example of general-purpose plastics involves polyvinyl chloride, polyvinylidene chloride, polyvinyl acetate, polyvinyl alcohol, polyvinyl acetal, polyethylene, polypropylene, polystyrene, AS resin, ABS resin, polymethyl methacrylate, polyacrylic acid, polyacrylonitrile, polybutadiene, polyethylene terephthalate, and the like; most of them are a polyethylene-based polymer. These are currently most-used plastics in view of inexpensiveness. As compared with engineering plastics, however, these are inferior in the aspect of physical properties such as heat resistance and mechanical properties, thereby not being appropriately used for industries and structural materials.

Engineering plastics have been developed as substitute materials for metallic materials for the purpose such as lightening, downsizing, highly performing and cost-reducing, being mainly used for industries. Physical properties of engineering plastics are generally superior to the above-mentioned general-purpose plastics. Polycarbonate, polyamide (nylon), polyacetal, polybutylene terephthalate, modified polyphenylene ether, glass-fiber reinforced polyethylene terephthalate, and the like are much in demand and denominated general-purpose engineering plastics.

Also, among them, engineering plastics developed so as to have further superior physical properties are denominated as super engineering plastics. An example of super engineering plastics involves polyarylate, polysulfone, polyether ether ketone, polyimide, polyamide imide, fluororesin, liquid crystal polymer, and the like. Most of these engineering plastics are condensation polymers.

Currently, the improvement of various properties of plastics and costs thereof have been increasingly required by the market. It is, however, difficult to develop new plastics meeting these requirements one after another, so that the improvement of the properties of plastics has been actively attempted by combining different kinds thereof.

For example, copolymerization is a method of synthesizing a polymer by combining plural monomers of different kinds. Most of the above-mentioned plastics are homopolymers composed of one kind of structural unit, while plural structural units can be introduced into one molecule of a polymer by copolymerizing. Some combinations of monomers can cause different properties from homopolymers composed of each of single the monomers so as to realize high performance. Also, variation of a polymerizing method can make a random polymer, a block polymer and a graft polymer to be highly functionalized. AS resin and ABS resin of general-purpose plastics are examples thereof and copolymers composed of acrylonitrile/styrene and acrylonitrile/butadiene/styrene respectively.

Thus, in the case where each segment as a component of a copolymer is synthesized by the same polymerizing method, the difficulty is somewhat different in accordance with an intended form (random, block and graft); nevertheless, the synthesis of a copolymer is not so difficult. However, in the case of combining segments polymerized by a different method, the synthesis of a copolymer is difficult, and thereby consideration is required for a synthesizing method.

For example, a method of combining a polyethylene segment and a polycondensation segment by synthesizing is described in Japanese Patent Laid-open Publication No. S59(1984)-27908, Japanese Patent Laid-open Publication No. S61(1986)-19630, Japanese Patent Laid-open Publication No. H9(1997)-302196, and the like. Here, such a copolymer is synthesized by using a macropolymerization initiator having a polycondensation segment and a polymerization initiating part in a molecule.

On the other hand, introduction of an inorganic component such as Si, Ti and Zr into a backbone of an organic polymer has been attempted in order to further improve the properties of plastics such as surface hardness, luster, antifouling property, strength, heat resistance, weather resistance and chemical resistance. In particular, organic-inorganic hybrid polymeric materials such that an inorganic component is dispersed into an organic component at a molecular level have high performance and high function, thereby being promising as a new raw material.

In Japanese Patent Laid-open Publication No. H8(1996)-104710 and Japanese Patent Laid-open Publication No. H8(1996)-104711, a method of radical-polymerizing an ethylenically unsaturated monomer (hereinafter referred to as merely 'an unsaturated monomer') by using an alkoxysilyl group-terminated azo-based initiator so as to hydrolyze and condense the obtained alkoxysilyl group-terminated polyethylene polymer is described as a preparing method of organic-inorganic hybrid polymeric materials. However, the obtained organic-inorganic hybrid polymeric materials have an organic backbone of a polyethylene structure and are low in heat resistance and mechanical strength, thereby not being appropriately used for industries and structural materials.

A method of introducing an alkoxysilyl group by utilizing a terminal hydroxyl group of polybutadiene so as to subsequently hydrolyze and polycondense this, is described as another preparing method of organic-inorganic hybrid polymeric materials on page 973 of Polymer Vol. 39, No. 4, published in 1998 and page 965 of Polymer Vol. 39, No. 4, published in 1998. Also, a method of introducing an alkoxysilyl group by utilizing a terminal hydroxyl group of polycaprolactone so as to subsequently hydrolyze and polycondense this, is described on page 855 of Polymer Vol. 39, No. 4, published in 1998 and page 3983 of Polymer Vol. 37, No. 17, published in 1996. Also, a method of introducing an alkoxysilyl group into a terminal of polyphenylene terephthalamide so as to hydrolyze and polycondense this, is described on page 4523 of Polymer Vol. 38, No. 17, published in 1997. Also, a method of introducing an alkoxysilyl group into polyether having an allyl group at a terminal by utilizing a hydrosilylation reaction is described in Japanese Patent Laid-open Publication No. H5(1993)-43679.

Most of engineering plastics are condensation polymers synthesized by a polycondensation reaction. Polymerization in a polycondensation reaction is performed by reacting a condensable functional group in monomers, and the functional groups are mostly consumed except for a molecular terminal, after the polymerization reaction. Accordingly, an alkoxysilyl group-containing polymer obtained by these conventional methods is of a type such that one alkoxysilyl group exists at both terminals of an organic polymer.

That is to say, in a conventional alkoxysilyl group-containing polymer, the number of alkoxysilyl groups contained in the polymer is restricted to two groups with respect to one molecule. Therefore, organic-inorganic hybrid polymeric materials obtained by hydrolyzing and polycondensing these polymers have a small quantity of inorganic components and crosslinking points, and the properties of plastic materials such as strength, heat resistance, weather resistance and chemical resistance are not sufficiently improved.

SUMMARY OF THE INVENTION

The present invention solves the above-mentioned conventional problem, and the object thereof is to provide a condensation polymer having many reactive silicon-containing groups with respect to one molecule and provide an organic-inorganic hybrid polymeric material having superior properties such as strength, heat resistance, weather resistance and chemical resistance by using the polymer.

The present invention provides a copolymer comprising a polyethylene segment which is a main chain; a reactive silicon-containing group which is a side group of the polyethylene segment; and a polycondensation segment bonded to the polyethylene segment, which is a part of the main chain together with the polyethylene segment or a side chain with respect to the polyethylene segment. Also, the present invention provides an organic-inorganic hybrid polymeric material obtained by hydrolyzing and polycondensing the above-mentioned copolymer, whereby the above-mentioned object is achieved.

Here, 'a segment' means a part composing a polymer. 'A polyethylene segment' means a part composing a polymer, whose backbone is a polyethylene structure. The polyethylene segment, therefore, may have a substituent. Also, 'a polycondensation segment' means a part composing a polymer, whose backbone is a structure formed by a condensation reaction.

Figure 1:
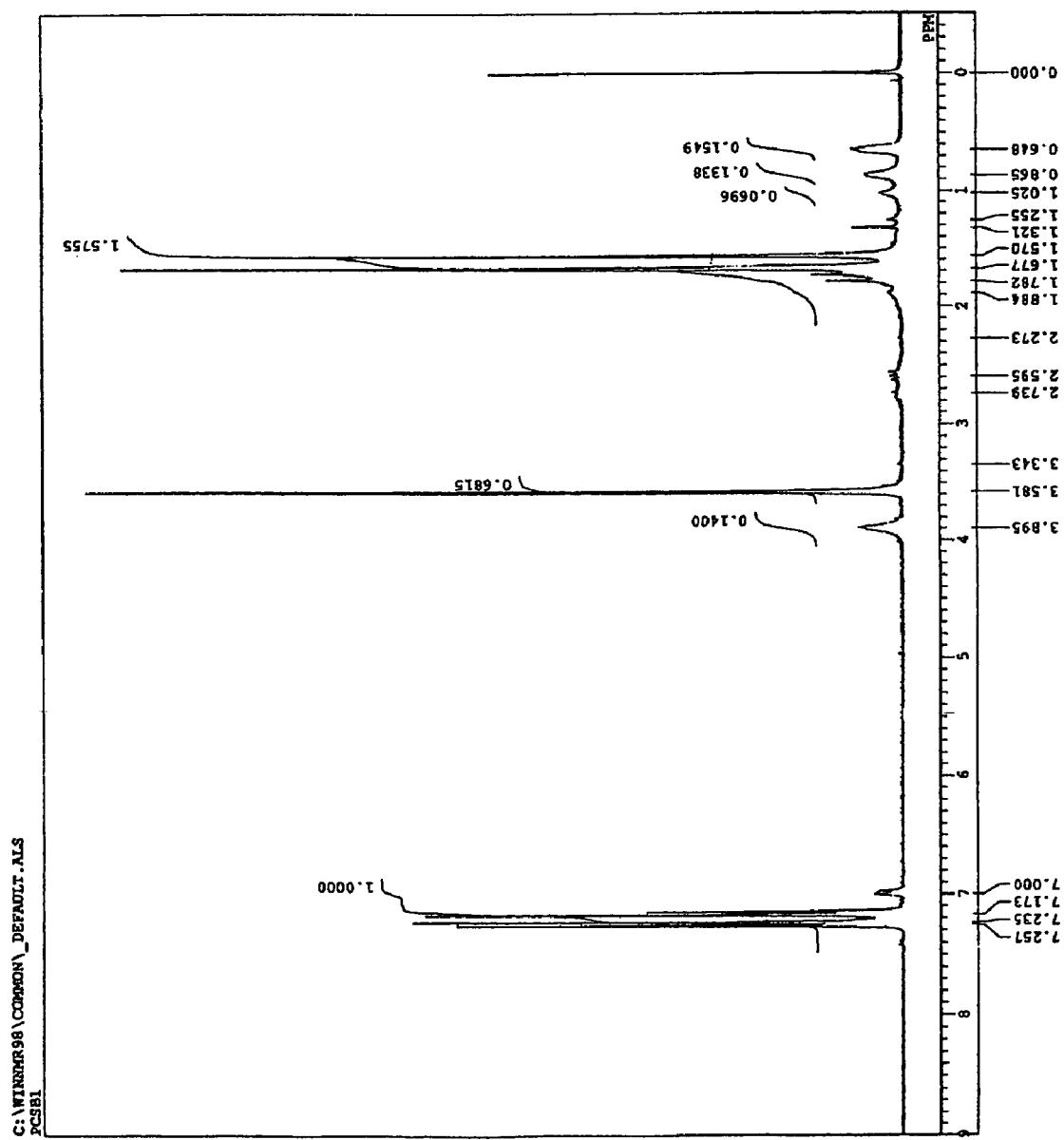
FIG. 1 is a $^1$H-NMR spectrum of a copolymer obtained in Example 1.

DETAILED DESCRIPTION OF PREFERRED EMBODIMENTS (1) Copolymer

A copolymer of the present invention can be generally represented as a polymer having a repeating unit represented by the following formula

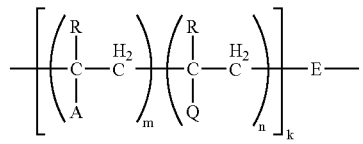

wherein, A is a reactive silicon-containing group, R is each independently a hydrogen atom or an alkyl group having 1 to 8 carbon atoms, Q is a group compatible with the reactive silicon-containing group, E is a polycondensation segment which is a part of a main chain, or a polyethylene segment having a polycondensation segment as a side chain, m is an integer of 1 or more, n is an integer of 0 or 1 or more, and k is an integer of 1 or more.

The reactive silicon-containing group may be a functional group which can mutually bond by hydrolysis, polycondensation reaction and the like. Specifically, the reactive silicon-containing group preferably has an alkoxysilyl group such as a trialkoxysilyl group, a dialkoxyalkylsilyl group and an alkoxydialkylsilyl group. The reason therefor is that an alkoxysilyl group can be simply converted into silica by a sol-gel method and also can be comparatively easily handled. Another reason therefor is that an unsaturated monomer having an alkoxysilyl group is comparatively easily available. Among these, a reactive silicon-containing group having a trialkoxysilyl group is particularly preferable. The reason therefor is that a reactive silicon-containing group having a trialkoxysilyl group is closely crosslinked in an organic-inorganic hybrid polymeric material produced therefrom by a sol-gel method and surface hardness thereof and the like can be further improved, as compared with a reactive silicon-containing group having a mono- or dialkoxysilyl group.

Specifically, A preferably has a structure represented by the following formula

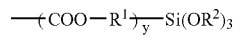

wherein, $R^1$ is an alkylene group having 1 to 10 carbon atoms or an arylene group having 6 to 20 carbon atoms, $R^2$ is an alkyl group having 1 to 10 carbon atoms, and y is 0 or 1. More preferably, $R^1$ is a methylene group, a propylene group, a butylene group and the like, and $R^2$ is a methyl group, an ethyl group, a propyl group, a butyl group and the like.

The polycondensation segment may contain a structure of resin formed by a condensation reaction, which is represented by engineering plastics. An example of such resin involves a condensation polymer such as polycarbonate, polyarylate, polysulfone, polyethylene terephthalate, polyamide, polyphenylene sulfide, polyphenylene ether, polyether ether ketone and polyimide. A preferable structure as a polycondensation segment is a segment of polycarbonate, polyarylate or polysulfone. Polycarbonate, polyarylate and polysulfone are transparent engineering plastics, while the above-mentioned polymers except these are generally opaque. Accordingly, an organic-inorganic hybrid polymeric material based on polycarbonate, polyarylate and polysulfone is expected to have a wider range of uses and also a higher commercial value.

The polycondensation segment may be a part of a main chain together with the polyethylene segment, or a side chain with respect to the polyethylene segment. In the case where the polycondensation segment is a part of a main chain, a copolymer can be regarded as a block copolymer. E has a structure represented, for example, by the following formula

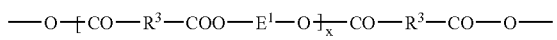

wherein, $E^1$ is a segment of polycarbonate, polyarylate or polysulfone, $R^3$ is each independently an alkylene group having 1 to 10 carton atoms or an arylene group having 6 to 20 carbon atoms, and x is an integer of 1 or more;

or the following formula

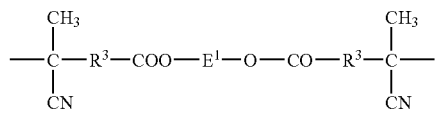

wherein, $E^1$ and $R^3$ are the same as defined above. More preferably, $E^1$ is a segment of polycarbonate, and $R^3$ is a methylene group, an ethylene group, a propylene group, a butylenes group, a phenylene group and the like.

In the case where a polycondensation segment is a side chain with respect to the polyethylene segment, a copolymer can be regarded as a graft copolymer. E has a structure represented, for example, by the following formula

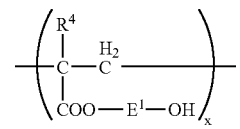

wherein, $E^1$ is a segment of polycarbonate, polyarylate or polysulfone, $R^4$ is a hydrogen atom or an alkyl group having 1 to 8 carbon atoms, and x is an integer of 1 or more. More preferably, $E^1$ is a segment of polycarbonate, and $R^4$ is a hydrogen atom or a methyl group.

A terminal hydroxyl group of $E^1$ can be made to function as a crosslinking point. This hydroxyl group may be converted into another kind of functional group. For example, this hydroxyl group may be further condensed with an unsaturated acid to be converted into an ethylenically unsaturated group. In that case, a terminal of $E^1$ can be incorporated into a polyethylene segment of another polymer.

That is to say, E may be a structure represented by the following formula

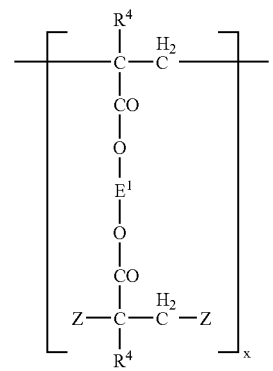

wherein, $R^4$ and $E^1$ are the same as defined above, and Z is each independently a segment of another polymer.

R and Q are substituents included in an unsaturated monomer which is raw materials of the polyethylene segment. These are not particularly limited if they are groups compatible with the reactive silicon-containing group. In general, R is each independently a hydrogen atom or an alkyl group having 1 to 8 carbon atoms, preferably a hydrogen atom or a methyl group. In general, Q is a hydrogen atom, an alkyl group having 1 to 8 carbon atoms, a carboxyl group, an alkoxycarbonyl group having 1 to 9 carbon atoms, an aryl group having 6 to 20 carbon atoms or a halogen atom, preferably a carboxyl group, a methoxycarbonyl group, an ethoxycarbonyl group, a butoxycarbonyl group, a phenyl group, a chlorine atom and the like.

A copolymer of the present invention has a number-average molecular weight of 1,000 to 500,000, preferably 3,000 to 100,000, and more preferably 10,000 to 50,000. In particular, a block copolymer of the present invention has a number-average molecular weight of 1,000 to 300,000, preferably 3,000 to 100,000, and more preferably 10,000 to 50,000. Also, a graft copolymer of the present invention has a number-average molecular weight of 1,000 to 300,000, preferably 3,000 to 100,000, and more preferably 10,000 to 50,000.

A number-average molecular weight of less than 1,000 in a copolymer brings the possibility of reducing film formability of an organic-inorganic hybrid polymeric material, while a number-average molecular weight of more than 500,000 therein brings the possibility of causing gelation. The molecular weight of the copolymer can be calculated from the results of measuring gel permeation chromatography (GPC) by using polystyrene as a standard.

With regard to a copolymer of the present invention, the ratio of a polyethylene segment to a polycondensation segment can be arbitrarily modified in accordance with performances required for a copolymer. This ratio is determined, for example, by the proportion of the charged quantity of a monomer, a macromer or a macropolymerization initiator, which is a raw material of both segments. For example, the ratio of a polyethylene segment to a polycondensation segment can be made into 1:99 to 99:1, 5:95 to 95:5, 10:90 to 90:10 and the like in weight.

(2) Producing Method of Copolymer

A block copolymer among copolymers of the present invention can be produced, for example, by radical-polymerizing a monomer mixture containing an unsaturated monomer having a reactive silicon-containing group and an unsaturated monomer compatible with the above-mentioned reactive silicon-containing group with the use of a macropolymerization initiator having a polycondensation segment.

An unsaturated monomer having a reactive silicon-containing group to be used can involve an unsaturated monomer having a structure represented, for example, by the following formula.

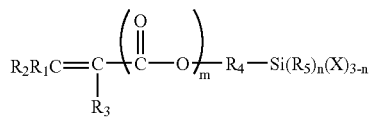

In the formula, $R_1$, $R_2$ and $R_3$ represent a hydrogen atom, or an alkyl group or an aralkyl group having 1 to 20 carbon atoms, which may be linear or branched and may contain a functional group or not. $R_1$, $R_2$ and $R_3$ may be the same or different. $R_4$ represents an alkylene group or an arylene group having 1 to 20 carbon atoms, which may be linear or branched and may contain a functional group or not. Also, $R_4$ may not exist and Si may be directly bonded to vinyl, acrylate, methacrylate and the like. $R_5$ represents an alkyl group having 1 to 12 carbon atoms, a phenyl group, a hydroxy group and a halogen atom, which may be the same or different, and X represents an alkoxy group having 1 to 8 carbon atoms, an acetoxy group or an acetylacetoxy group, which may be the same or different, preferably an alkoxy group having 1 to 4 carbon atoms. m is 0 or 1, and n is an integer of 0 to 2.

A specific example of an unsaturated monomer having a reactive silicon-containing group involves vinyltrimethoxysilane, vinyltriethoxysilane, vinyltriisopropoxysilane, vinylmethyldimethoxysilane, vinylmethyldiethoxysilane, vinylphenyldiethoxysilane, vinyldimethylethoxysilane, vinyldiphenylethoxysilane, acryloxypropyltrimethoxysilane, acryloxypropyldimethylmethoxysilane, acryloxypropylmethyldimethoxysilane, acryloxypropyldimethylethoxysilane, acryloxypropylmethyldiethoxysilane, acryloxypropyltriethoxysilane, acryloxymethyltriethoxysilane, acryloxypropyltris(methoxyethoxy)silane, methacryloxypropyltrimethoxysilane, methacryloxypropyldimethylmethoxysilane, methacryloxypropylmethyldimethoxysilane, methacryloxypropyldimethylethoxysilane, methacryloxypropylmethyldiethoxysilane, methacryloxypropyltriethoxysilane, methacryloxymethyltriethoxysilane, methacryloxypropyltris(methoxyethoxy)silane, and the like; a part thereof is available from CHISSO CORPORATION, SHIN-ETSU CHEMICAL CO., LTD. and the like.

With regard to these unsaturated monomers, only one kind thereof may be used or two kinds or more thereof may be used together. The polymerizing of such an unsaturated monomer enables the synthesizing of an ethylene-based polymer such that a main backbone is polyolefin, polyacrylate, polymethacrylate or the like, and a side chain is a reactive silicon-containing group. An Si part of the reactive silicon-containing group may be another metal such as Al, Ti and Zr, and an alkoxy group part may be an acetoxy group or an acetylacetoxy group.

An unsaturated monomer compatible with a reactive silicon-containing group is used as required in order to control the number and distribution of reactive silicon-containing groups in a copolymer. The modification of the kind and quantity of the unsaturated monomer to be used enables the control of the properties of an organic-inorganic hybrid polymeric material to be hereafter prepared. A specific example of such an unsaturated monomer involves styrene, α-methyl styrene, acrylic acid, methacrylic acid, methyl acrylate, methyl methacrylate, ethyl methacrylate, acrylonitrile, vinyl chloride, vinylidene chloride, vinyl acetate, butadiene, and the like.

A macropolymerization initiator means a polymer having a functional group for initiating radical polymerization. A macropolymerization initiator to be herein used is a condensation polymer having a functional group for initiating radical polymerization. The functional group for initiating radical polymerization generally involves a diazo group and a peroxy group.

An example of a condensation polymer having a diazo group involves a compound represented by the following formula.

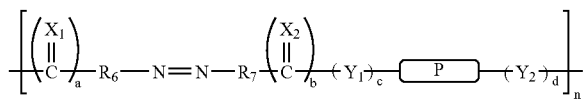

In the formula, $R_6$ and $R_7$ represent an alkylene group or an arylene group having 1 to 20 carbon atoms, which may be linear or branched and may contain a functional group or not. Also, $R_6$ and $R_7$ may be the same or different. $X_1$ and $X_2$ represent O or S, which may be the same or different. $Y_1$ and $Y_2$ represent O or an imino group, which may be the same or different. a, b, c and d are 0 or 1, and n is an integer of 1 or more. Also, P represents a segment of the same condensation polymer as a polycondensation segment of the above-mentioned copolymer.

A preparing method of such a compound involves a method described, for example, in Japanese Patent Laid-open Publication No. S59(1984)-27908, Japanese Patent Laid-open Publication No. H9(1997)-302196 and Japanese Patent Laid-open Publication No. H10(1998)-67836. Here, a condensation polymer having a diazo group is prepared by condensing polycarbonate oligomer having a hydroxyl group at both terminals and carboxylic acid chloride having a diazo group.

A condensation polymer having a diazo group has a number-average molecular weight of 1,000 to 300,000, preferably 3,000 to 200,000, and more preferably 10,000 to 100,000. A number-average molecular weight of less than 1,000 in this condensation polymer brings the possibility that the molecular weight of an internal polycondensation segment is compelled to relatively lower, so as to render insufficient the properties of an organic-inorganic hybrid polymeric material to be thereafter prepared.

Also, a condensation polymer having a diazo group has 1 to 100 on the average of diazo groups in a molecule, preferably 2 to 50 on the average, and more preferably 3 to 20 on the average. A diazo group of less than 2 in number, however, brings the possibility of rendering insufficient the efficiency as a polymerization initiator.

An example of a condensation polymer having a peroxy group involves a compound represented by the following formula.

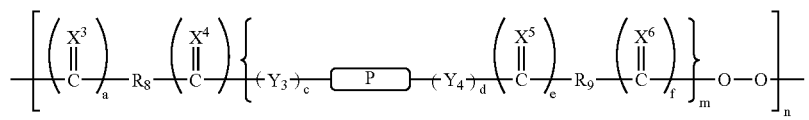

In the formula, $R_8$ and $R_9$ represent an alkylene group or an arylene group having 1 to 20 carbon atoms, which may be linear or branched and may contain a functional group or not. Also, $R_8$ and $R_9$ may be the same or different. $X_3$, $X_4$, $X_5$ and $X_6$ represent O or S, which may be the same or different. $Y_3$ and $Y_4$ represent O or an imino group, which may be the same or different. a, b, c, d, e and f are 0 or 1, and m and n is an integer of 1 or more. Also, P represents a segment of the same condensation polymer as a polycondensation segment of the above-mentioned copolymer.

A preparing method of such a compound involves a method described, for example, on pages 73 to 79 of Japanese Journal of Polymer Science and Technology, Vol. 44, No. 2, published in 1987. Here, a condensation polymer having a peroxy group is prepared by reacting sodium peroxide with oligoester synthesized from adipic acid chloride and triethylene glycol.

A condensation polymer having a peroxy group has a number-average molecular weight of 1,000 to 300,000, preferably 3,000 to 200,000, and more preferably 10,000 to 100,000. A number-average molecular weight of less than 1,000 in this condensation polymer brings the possibility that the molecular weight of an internal polycondensation segment is compelled to relatively lower, so as to render insufficient the properties of an organic-inorganic hybrid polymeric material to be thereafter prepared, while a number-average molecular weight of more than 300,000 therein brings the possibility of causing gelation.

Also, a condensation polymer having a peroxy group has 1 to 100 on the average of peroxy groups in a molecule, preferably 2 to 50 on the average, and more preferably 3 to 20 on the average. A peroxy group of less than 2, however, brings the possibility of rendering insufficient the efficiency as a polymerization initiator.

An available method of radical-polymerizing a monomer mixture involves a conventional method such as a solution polymerization method, a bulk polymerization method, a suspension polymerization method and an emulsion polymerization method. The warming and mixing are typically performed at approximately room temperature to 100° C., and then the reaction is continued until a macropolymerization initiator is completely consumed. The composition, molecular weight and the like of a polyethylene segment and a polycondensation segment in the obtained copolymer are controlled by several conditions such as the content and molecular weight of a polymerization initiating functional group in a macropolymerization initiator, and the added quantity, reaction temperature and time of an unsaturated monomer.

A graft copolymer among copolymers of the present invention can be produced, for example, by radical-polymerizing a monomer mixture containing an unsaturated monomer having a reactive silicon-containing group, an unsaturated macromer having a polycondensation segment and an unsaturated monomer compatible with the above-mentioned reactive silicon-containing group.

An unsaturated macromer means a polymer having an ethylenically unsaturated group at a terminal. An unsaturated macromer to be herein used is an unsaturated macromer having a polycondensation segment. An unsaturated macromer having a polycondensation segment can be prepared, for example, by reacting a condensation polymer having a hydroxyl group with (i) a carboxylic acid and the like having a radically polymerizable functional group or (ii) a halide and the like having a radically polymerizable functional group.

An example of a condensation polymer having a hydroxyl group involves a producing method of polycarbonate diol described, for example, in Japanese Examined Patent Publication No. H7(1995)-33441. An example of (i) a carboxylic acid and the like involves acrylic acid, methacrylic acid and a derivative thereof. Also, an example of (ii) a halide and the like involves allyl chloride and allyl bromide. These are allowed to have a condensation reaction with a hydroxyl group introduced into a condensation polymer.

An unsaturated macromer has a number-average molecular weight of 500 to 200,000, preferably 1,000 to 50,000, and more preferably 1,500 to 10,000. A number-average molecular weight of less than 500 in this unsaturated macromer brings the possibility of reducing film formability of an organic-inorganic hybrid polymeric material, while a number-average molecular weight of more than 200,000 therein brings the possibility of causing gelation. Also, an ethylenically unsaturated group may exist at one terminal or both terminals of an unsaturated macromer.

A method of radical-polymerizing a monomer mixture is the same as is described with regard to a block copolymer except for replacing a macropolymerization initiator as a polymerization initiator with a conventional low-molecular-weight polymerization initiator, such as 2,2'-azobis(isobutyronitrile).

(3) Organic-Inorganic Hybrid Polymeric Material

An organic-inorganic hybrid polymeric material can be produced by hydrolyzing and polycondensing a copolymer of the present invention. A sol-gel reaction is mainly utilized for this production.

Hydrolysis and polycondensation by a sol-gel method mean a reaction such that an alkoxy group is converted into a hydroxyl group by reacting water with a metal alkoxy group of a solute in a solution; next, a compound having a hydroxy metal group (such as —Si—OH) causes a dehydration or dealcoholization reaction with an adjacent molecule or functional group by polycondensing this hydroxyl group concurrently therewith so as to be three-dimensionally crosslinked through an inorganic covalent bond.

A solvent to be used is allowable if it can favorably dissolve a compound as a solute, and is preferably a polar solvent miscible with water in consideration of hydrolysis; specifically, involving alcohols such as methanol, ethanol, n-propanol, isopropanol and n-butanol, polyhydric alcohols such as ethylene glycol and diethylene glycol, glycol monoethers (cellosolve) such as ethylene glycol monomethyl ether and ethylene glycol monoethyl ether, glycol diethers (glime) such as ethylene glycol dimethyl ether, ethylene glycol diethyl ether and diethylene glycol dimethyl ether, ketones such as acetone, methyl ethyl ketone and cyclohexanone, cyclic ethers such as tetrahydrofuran, 1,3-dioxane and 1,4-dioxane, esters such as methyl formate and ethyl acetate, a nonprotic polar solvent such as acetonitrile, formamide, N,N-dimethylformamide and dimethyl sulfoxide, and the like. Also, a mixture solvent of these is allowable.

Water having a quantity required for converting all alkoxy groups into hydroxyl groups may be added for the use of hydrolyzing, or moisture in a reaction system or the air may be used. The reaction conditions are desirably approximately a temperature of room temperature to 100° C. and a time period of 0.5 to 24 hours. Also, on that occasion, the following may be used: an acidic catalyst such as hydrochloric acid, acetic acid, sulfuric acid, nitric acid, benzenesulfonic acid and toluenesulfonic acid, and a basic catalyst such as sodium hydroxide, potassium hydroxide, ammonia, triethylamine, piperidine and DBU (1,8-diazabicyclo[5.4.0] undec-7-ene). On this occasion, not merely hydrolysis but also condensation reaction concurrently progresses depending on the conditions. Thereafter, the condensation reaction progresses in the accompaniment to gelation, evaporation of a solvent and drying of a sample, and heating may be performed on proper conditions in the case of further promoting the condensation reaction so as to render the crosslinking more consolidated. Also, in order to inhibit cracks possibly caused on the occasion of gelation, drying and heating, formamide, N,N-dimethylformamide, oxalic acid, dioxane and the like may be added, or acetylacetone and the like may be added as an additive.

In the case of hydrolyzing and polycondensing a copolymer of the present invention, a reactive silicon-containing group inside a copolymer is hydrolyzed so as to be made into a silanol group (—Si—OH), and is thereafter condensed with adjacent another silanol group or reactive silicon-containing group to form a siloxy chain (—Si—O—Si—), whereby being made into a three-dimensionally crosslinked organic-inorganic hybrid polymeric material.

Also, a copolymer of the present invention may be hydrolyzed and polycondensed together with metal, metal alkoxide compound, metal oxide, metal complex, inorganic salt and the like having a metallic element such as Si, Ti, Zr, Al, Fe, Cu, Sn, B, Ge, Ce, Ta or W. Thus, a reactive silicon-containing group inside a copolymer and a metal alkoxide compound are hydrolyzed and condensed together so as to form a covalent bond between the copolymer and minute metal oxide and be made into a mutually microdispersed organic-inorganic hybrid polymeric material, resulting in the adjustment of inorganics content, crosslink density between polymers and the like, and the improvement of the properties and functions of an organic-inorganic hybrid polymeric material.

An example of a metal alkoxide compound appropriately for such uses is represented by the following formula.

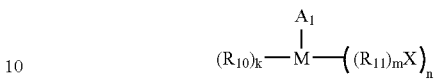

In the formula, $R_{10}$ represents a hydrogen atom, a halogen atom, an alkyl group having 1 to 12 carbon atoms, preferably 1 to 6 carbon atoms, or a phenyl group. A represents an alkoxy group having 1 to 8 carbon atoms, preferably 1 to 4 carbon atoms. M represents a metallic element selected from the group consisting of Si, Ti, Zr, Al, Fe, Cu, Sn, B, Ge, Ce, Ta, W and the like, preferably Si, Ti, Zr and Al. $R_{11}$ represents an alkylene group or an alkylidene group having 1 to 4 carbon atoms, preferably 2 to 4 carbon atoms. X represents a general functional group such as an isocyanate group, an epoxy group, a carboxyl group, an acid halide group, an acid anhydride group, an amino group, a thiol group, a vinyl group, a (meth)acryl group and a hydrogen atom. k represents an integer of 0 to 5, 1 represents an integer of 1 to 6, m represents an integer of 0 or 1, and n represents an integer of 0 to 5.

An example of a metal alkoxide compound in which M is Si can involve tetraalkoxysilanes such as tetramethoxysilane, tetraethoxysilane, tetraisopropoxysilane and tetrabutoxysilane, alkylalkoxysilanes such as trimethoxysilane, triethoxysilane, tri-n-propoxysilane, dimethoxysilane, diethoxysilane, diisopropoxysilane, monomethoxysilane, monoethoxysilane, monobutoxysilane, methyldimethoxysilane, ethyldiethoxysilane, dimethylmethoxysilane, diisopropylisopropoxysilane, methyltrimethoxysilane, ethyltriethoxysilane, n-propyltri-n-propoxysilane, butyltributoxysilane, dimethyldimethoxysilane, diethyldiethoxysilane, diisopropyldiisopropoxysilane, dibutyldibutoxysilane, trimethylmethoxysilane, triethylethoxysilane, tri-n-propyl-n-propoxysilane, tributylbutoxysilane, phenyltrimethoxysilane, diphenyldiethoxysilane and triphenylmethoxysilane, (alkyl) alkoxysilanes having an isocyanate group such as 3-isocyanatopropyltriethoxysilane, 2-isocyanatoethyltri-n-propoxysilane, 3-isocyanatopropylmethyldimethoxysilane, 2-isocyanatoethylethyldibutoxysilane, 3-isocyanatopropyldimethylisopropoxysilane, 2-isocyanatoethyldiethylbutoxysilane, di(3-isocyanatopropyl)diethoxysilane, di(3-isocyanatopropyl)methylethoxysilane and ethoxytriisocyanatosilane, (alkyl)alkoxysilane having an epoxy group such as 3-glycidoxypropyltriethoxysilane, 3-glycidoxypropylmethyldimethoxysilane, 3-glycidoxypropyldimethylethoxysilane, 2-(3,4-epoxycyclohexyl)ethyltrimethoxysilane and 3,4-epoxybutyltrimethoxysilane, (alkyl) alkoxysilane having a carboxyl group such as carboxymethyltriethoxysilane, carboxymethylethyldiethoxysilane and carboxyethyldimethylmethoxysilane, alkoxysilane having an acid anhydride group such as 3-(triethoxysilyl)-2-methylpropylsuccinic anhydride, alkoxysilane having an acid halide group such as 2-(4-chlorosulfonylphenyl) ethyltriethoxysilane, (alkyl)alkoxysilane having an amino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyldimethoxysilane and N-phenyl-3-aminopropyltrimethoxysilane, (alkyl)alkoxysilane having a thiol group such as 3-mercaptopropyltrimethoxysilane, 2-mercaptoethyltriethoxysilane and 3-mercaptopropylmethyldimethoxysilane, (alkyl)alkoxysilane having a vinyl group such as vinyltrimethoxysilane and vinylmethyldiethoxysilane, (alkyl)alkoxysilane having a (meth)acryl group such as 3-(meth)acryloxypropyltrimethoxysilane, 3-(meth)acryloxypropyltriethoxysilane and 3-(meth)acryloxypropylmethyldimethylsilane, (alkyl)alkoxysilane having a halogen atom such as triethoxyfluorosilane, 3-chloropropyltrimethoxysilane, 3-bromopropyltriethoxysilane and 2-chloroethylmethyldimethoxysilane.

A similar compound can be exemplified with regard to not merely Si but also other metals such as Ti, Zr, Al, Fe, Cu, Sn, B, Ge, Ce, Ta and W.

With regard to these metal alkoxide compounds, only one kind thereof may be used or two kinds or more thereof may be used together. Also, the following may be used: a metal alkoxide compound such that two kinds or more of metallic elements are contained in one molecule, such as $Mg[Al(iso-OC_3H_7)_4]_2$, $Ba[Zr_2(OC_2H_5)_9]_2$ and $(C_3H_7O)_2Zr[Al(OC_3H_7)_4]_2$, and a metal alkoxide compound of an oligomer type having two or more repeating units in one molecule, such as tetramethoxysilane oligomer and tetraethoxysilane oligomer. Also, an alkoxy group may be an acetoxy group or an acetylacetoxy group.

Also, not merely inorganic compounds as described above but also other plastics and organic compounds may be added with regard to the present invention. In particular, commercial plastics are desirably added because of being advantageous in view of costs; however, they are required to be compatible with a copolymer of the present invention. An example of such plastics involves polyacrylate, polymethacrylate, polymethyl acrylate, polymethyl methacrylate, polyethyl methacrylate, polycarbonate, polyester, polyarylate, polysulfone, and the like.

In the case of using these plastics together in the present invention, a copolymer of the present invention functions as a compatibilizer, whereby rendering plastics and inorganic compounds miscible, which are usually incompatible.

A copolymer of the present invention has plural reactive silicon-containing groups at a terminal of a molecule and inside a molecule, and a reactive silicon-containing group included in one molecule is large in number. Also, a copolymer of the present invention has a segment of a polycondensation polymer with superior physical properties. Consequently, an organic-inorganic hybrid material with a high crosslink density and a tough backbone can be obtained by hydrolyzing and polycondensing a composition containing a copolymer of the present invention. Thus, the properties of an inorganic material such as heat resistance, weather resistance, hardness, stiffness, chemical resistance, antifouling property, mechanical strength and flame retardancy can be favorably provided for a condensation polymer.

An organic-inorganic hybrid material according to the present invention can be used for industrial plastic materials, particularly, structural materials, optical materials, plastic molded products and films, sealing materials, polymer silane coupling agents, compatibilizers, surface modifiers, hard coating agents, resin additives and the like.

The present invention is further detailed hereinafter referring to synthesis examples, examples and comparative examples, and is not limited thereto. Unless otherwise specified, 'part' in each of the examples means 'part by weight' and '%' means '% by weight'.

SYNTHESIS EXAMPLE 1

Synthesis of Polycarbonate having Hydroxyl Group at both Terminals

A mixture of 203.2 g (10 mmol) of commercial polycarbonate (Iupilon E-2000, manufactured by MITSUBISHI ENGINEERING-PLASTICS CORPORATION), 22.8 g (100 mmol) of bisphenol A, 2.2 g (10 mmol) of zinc acetate, and 2 L (liter) of 1,2,4-trichlorobenzene was heated with stirring at 180° C. for 3 hours. After being cooled, the reaction mixture was poured gradually into volumes of methanol. The resulting precipitate was filtered to give 174.0 g of polycarbonate having hydroxyl groups at both terminals (a yield of 77%). GPC showed that the number-average molecular weight was 3960.

SYNTHESIS EXAMPLE 2

Synthesis of Polycarbonate having Methacryl Groups at both Terminals

Into a solution of 39.6 g (10 mmol) of both-terminal hydroxyl group polycarbonate obtained in Synthesis Example 1 and 2.0 g (20 mmol) of triethylamine in 100 ml of chloroform was dropped 2.1 g (20 mmol) of methacrylic acid chloride dissolved in 100 ml of chloroform while cooling with ice. The resulting mixture was heated with stirring at 50° C. for 1 hour. After being cooled, the reaction mixture was poured gradually into volumes of methanol. The resulting precipitate was filtered to give 41 g of polycarbonate having methacryl groups at both terminals (a yield of 98%). GPC showed that the number-average molecular weight was 4100. Also, $^1$H-NMR showed the introduction of a methacryl group into polycarbonate.

SYNTHESIS EXAMPLE 3

Synthesis of Polycarbonate having Methacryl Group at One Terminal

Into a solution of 39.6 g (10 mmol) of both-terminal hydroxyl group polycarbonate obtained in Synthesis Example 1 and 1.0 g (10 mmol) of triethylamine in 100 ml of chloroform was dropped 1.05 g (10 mmol) of methacrylic acid chloride dissolved in 100 ml of chloroform while cooling with ice. The resulting mixture was heated with stirring at 50° C. for 1 hour. After being cooled, the reaction mixture was poured gradually into volumes of methanol. The resulting precipitate was filtered to give 40 g of polycarbonate having a methacryl group at one terminal (a yield of 98%). GPC showed that the number-average molecular weight was 4000. Also, $^1$H-NMR showed the introduction of a methacryl group into polycarbonate.

SYNTHESIS EXAMPLE 4

Synthesis of Polycarbonate Containig Azo Groups

Into a solution of 39.6 g (10 mmol) of both-terminal hydroxyl group polycarbonate obtained in Synthesis Example 1 and 2.0 g (20 mmol) of triethylamine in 100 ml of chloroform was dropped 3.2 g (10 mmol) of 4,4'-azobis (4-cyanopentanoic acid chloride) dissolved in 100 ml of chloroform while cooling with ice. The resulting mixture was heated with stirring at 35° C. for 1 hour. After being cooled, the reaction mixture was poured gradually into volumes of methanol. The resulting precipitate was filtered to give 41 g of polycarbonate containing azo groups (a yield of 96%). GPC showed that the number-average molecular weight was 39600, and that the azo group average bonding number was 9.4.

SYNTHESIS EXAMPLE 5

Synthesis of Polycarbonate Containing Peroxy Groups

Peroxy group-containing polycarbonate was synthesized referring to pages 73 to 79 of Japanese Journal of Polymer Science and Technology, Vol. 44, No. 2, published in 1987. Into a solution of 39.6 g (10 mmol) of both-terminal hydroxyl group polycarbonate obtained in Synthesis Example 1 and 4.0 g (40 mmol) of triethylamine in 100 ml of chloroform was dropped 3.7 g (20 mmol) of adipic acid chloride dissolved in 50 ml of chloroform while cooling with ice. The resulting mixture was heated with stirring at 50° C. for 1 hour and thereafter cooled. A solution such that 1.0 g (24 mmol) of sodium hydroxide, 1.4 g (12 mmol) of 30% -aqueous hydrogen peroxide and 0.4 g of dioctyl phosphate were dissolved in 50 g of ion exchange water was added to this solution while cooling with ice with stirring for 3 hours. The chloroform layer was taken out of the reaction mixture after standing and being separated, and was poured into volumes of methanol. The resulting precipitate was filtered to give 41 g of polycarbonate containing peroxy groups (a yield of 93%). GPC measurement showed that the number-average molecular weight was 22300, and that the peroxy group average bonding number was 5.3.

EXAMPLE 1

Synthesis of Polymethacrylate-Polycarbonate Block Copolymer having Alkoxysilyl Group A mixture of 7.9 g (0.2 mmol) of azo group-containing polycarbonate obtained in Synthesis Example 4, 9.0 g (36 mmol) of 3-(trimethoxysilyl)propyl methacrylate, and 150 ml of chloroform was heated with stirring at 60° C. for 5 hours. The cooled reaction mixture was poured gradually into volumes of methanol. The resulting precipitate was filtered to give 5.4 g of block copolymer (a yield of 32%). GPC showed that the number-average molecular weight was 25300. Also, the weight ratio of polycarbonate and poly-3-(trimethoxysilyl)propyl methacrylate in the copolymer was calculated to 65:35 by $^1$H-NMR.

EXAMPLE 2

Synthesis of Polymethacrylate-Polycarbonate Block Copolymer having Alkoxysilyl Group A mixture of 7.9 g (0.2 mmol) of azo group-containing polycarbonate obtained in Synthesis Example 4, 4.5 g (18 mmol) of 3-(trimethoxysilyl)propyl methacrylate, and 150 ml of chloroform was heated with stirring at 60° C. for 5 hours. The cooled reaction mixture was poured gradually into volumes of methanol. The resulting precipitate was filtered to give 8.1 g of block copolymer (a yield of 65%). GPC showed that the number-average molecular weight was 20300. Also, the weight ratio of polycarbonate and poly-3-(trimethoxysilyl)propyl methacrylate in the copolymer was calculated to 83:17 by $^1$H-NMR.

EXAMPLE 3

Synthesis of Polymethacrylate-Polycarbonate Block Copolymer having Alkoxysilyl Group A mixture of 7.9 g (0.2 mmol) of azo group-containing polycarbonate obtained in Synthesis Example 4, 2.3 g (9 mmol) of 3-(trimethoxysilyl)propyl methacrylate, and 150 ml of chloroform was heated with stirring at 60° C. for 5 hours. The cooled reaction mixture was poured into volumes of methanol. The resulting precipitate was filtered to give 9.0 g of block copolymer (a yield of 88%). GPC showed that the number-average molecular weight was 17300. Also, the weight ratio of polycarbonate and poly-3-(trimethoxysilyl) propyl methacrylate in the copolymer was calculated to 94:6 by $^1$H-NMR.

EXAMPLE 4

Synthesis of Polymethacrylate-Polycarbonate Block Copolymer having Alkoxysilyl Group A mixture of 4.5 g (0.2 mmol) of peroxy group-containing polycarbonate obtained in Synthesis Example 5, 4.5 g (18 mmol) of 3-(trimethoxysilyl)propyl methacrylate, and 100 ml of chloroform was heated with stirring at 60° C. for 5 hours. The cooled reaction mixture was poured gradually into volumes of methanol. The resulting precipitate was filtered to give 5.5 g of block copolymer (a yield of 61%). GPC showed that the number-average molecular weight was 18800. Also, the weight ratio of polycarbonate and poly-3-(trimethoxysilyl)propyl methacrylate in the copolymer was calculated to 85:15 by $^1$H-NMR.

EXAMPLE 5

Synthesis of Polymethacrylate-Polycarbonate Graft Copolymer having Alkoxysilyl Group A mixture of 8.2 g (2 mmol) of both-terminal methacryl group polycarbonate obtained in Synthesis Example 2, 2.5 g (10 mmol) of 3-(trimethoxysilyl)propyl methacrylate, 0.03 g (0.2 mmol) of 2,2'-azobis(isobutyronitrile), and 100 ml of chloroform was heated with stirring at 60° C. for 5 hours. The cooled reaction mixture was poured gradually into volumes of methanol. The resulting precipitate was filtered to give 4.8 g of graft copolymer (a yield of 45%). GPC showed that the number-average molecular weight was 18700. Also, the weight ratio of polycarbonate and poly-3-(trimethoxysilyl)propyl methacrylate in the copolymer was calculated to 33:67.

EXAMPLE 6

Synthesis of Polymethacrylate-Polycarbonate Graft Copolymer having Alkoxysilyl Group A mixture of 8.1 g (2 mmol) of one-terminal methacryl group polycarbonate obtained in Synthesis Example 3, 2.5 g (10 mmol) of 3-(trimethoxysilyl)propyl methacrylate, 0.03 g (0.2 mmol) of 2,2'-azobis(isobutyronitrile), and 100 ml of chloroform was heated with stirring at 60° C. for 5 hours. The cooled reaction mixture was poured gradually into volumes of methanol. The resulting precipitate was filtered to give 4.6 g of graft copolymer (a yield of 43%). GPC showed that the number-average molecular weight was 18200. Also, the weight ratio of polycarbonate and poly-3-

(trimethoxysilyl)propyl methacrylate in the copolymer was calculated to 42:58 by $^1$H-NMR.

EXAMPLE 7

Formation of Film by Sol-Gel Reaction

To a solution of 1.0 g of a block copolymer with a weight composition ratio of 65:35 synthesized in Example 1 in 10 ml of tetrahydrofuran was added 0.23 g of 1 mol/L(liter)-aqueous hydrochloric acid. The resulting soltion was stirred at a room temperature for 10 minutes. This solution was divided into two parts, one of which was used for spin coating onto a glass substrate and the other was cast on a petri dish made of polyethylene to evaporate the solvent, whereby obtaining an opaque film with a thickness of approximately 40 μm.

EXAMPLE 8

Formation of Film by Sol-Gel Reaction

To a solution of 1.0 g of a block copolymer with a weight composition ratio of 83:17 synthesized in Example 2 in 10 ml of tetrahydrofuran was added 0.11 g of 1 mol/L-aqueous hydrochloric acid. The resulting solution was stirred under room temperature for 10 minutes. This solution was divided into two parts, one of which was used for spin coating onto a glass substrate and the other was cast on a petri dish made of polyethylene to evaporate the solvent, whereby obtaining a transparent and favorable film with a thickness of approximately 40 μm.

EXAMPLE 9

Formation of Film by Sol-Gel Reaction

To a solution of 1.0 g of a block copolymer with a weight composition ratio of 94:6 synthesized in Example 3 in 10 ml of tetrahydrofuran was added 0.04 g of 1 mol/L-aqueous hydrochloric acid. The resulting solution was stirred under room temperature for 10 minutes. This solution was divided into two parts, one of which was used for spin coating onto a glass substrate and the other was cast on a petri dish made of polyethylene to evaporate the solvent, whereby obtaining a translucent and favorable film with a thickness of approximately 40 μm.

EXAMPLE 10

Formation of Film by Sol-Gel Reaction

To a solution of 1.0 g of a block copolymer with a weight composition ratio of 85:15 synthesized in Example 4 in 10 ml of tetrahydrofuran was added 0.10 g of 1 mol/L-aqueous hydrochloric acid. The resulting solution was stirred under room temperature for 10 minutes. This solution was divided into two parts, one of which was used for spin coating onto a glass substrate and the other was cast on a petri dish made of polyethylene to evaporate the solvent, whereby obtaining a transparent and favorable film with a thickness of approximately 40 μm.

EXAMPLE 11

Formation of Film by Sol-Gel Reaction

To a solution of 1.0 g of a graft copolymer with a weight composition ratio of 33:67 synthesized in Example 5 in 10 ml of tetrahydrofuran was added 0.44 g of 1 mol/L-aqueous hydrochloric acid. The resulting solution was stirred under room temperature for 10 minutes. This solution was divided into two parts, one of which was used for spin coating onto a glass substrate and the other was cast on a petri dish made of polyethylene to evaporate the solvent, whereby obtaining a transparent and favorable film with a thickness of approximately 30 μm.

EXAMPLE 12

Formation of Film by Sol-Gel Reaction

To a solution of 1.0 g of a graft copolymer with a weight composition ratio of 42:58 synthesized in Example 6 in 10 ml of tetrahydrofuran was added 0.38 g of 1 mol/L-aqueous hydrochloric acid. The resulting solution was stirred under room temperature for 10 minutes. This solution was divided into two parts, one of which was used for spin coating onto a glass substrate and the other was cast on a petri dish made of polyethylene to evaporate the solvent, whereby obtaining a transparent and favorable film with a thickness of approximately 40 μm.

COMPARATIVE EXAMPLE 1

A mixture of 5.0 g (20 mmol) of 3-(trimethoxysilyl)propyl methacrylate, 0.07 g (0.4 mmol) of 2,2'-azobis(isobutyronitrile), and 20 ml of chloroform was heated with stirring at 60° C. for 5 hours. The cooled reaction mixture was poured gradually into volumes of hexane. The resulting precipitate was filtered to give 3.4 g of poly-3-(trimethoxysilyl)propyl methacrylate (a yield of 68%). GPC showed that the number-average molecular weight was 28000.

COMPARATIVE EXAMPLE 2

A solution of 0.2 g of commercial polycarbonate (Iupilon E-2000, manufactured by MITSUBISHI ENGINEERING-PLASTICS CORPORATION) in 5 ml of chloroform was spin-coated on a glass substrate.

Analyses and Evaluations

Figure 2:
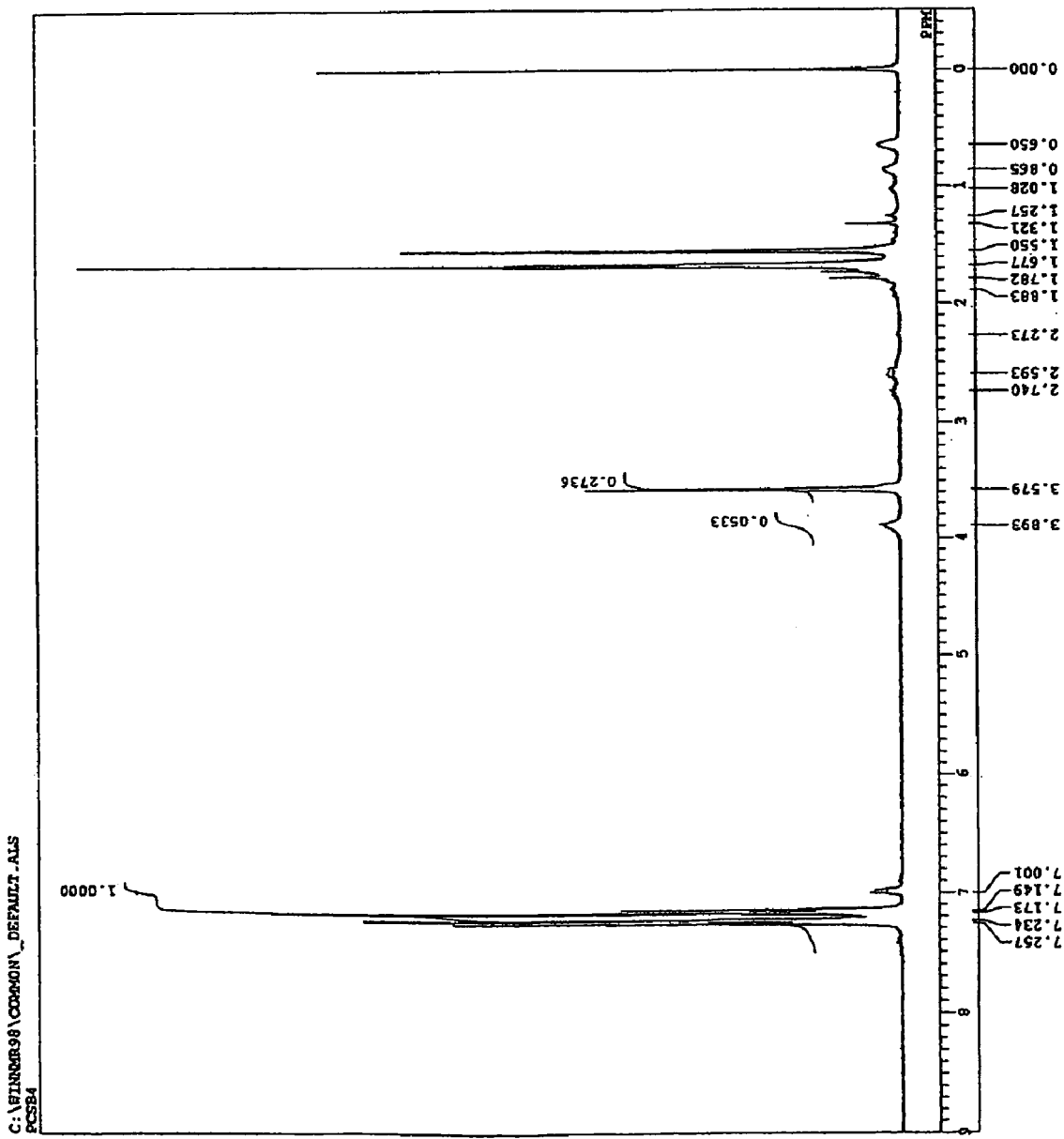
FIG. 2 is a $^1$H-NMR spectrum of a copolymer obtained in Example 2.
Figure 3:
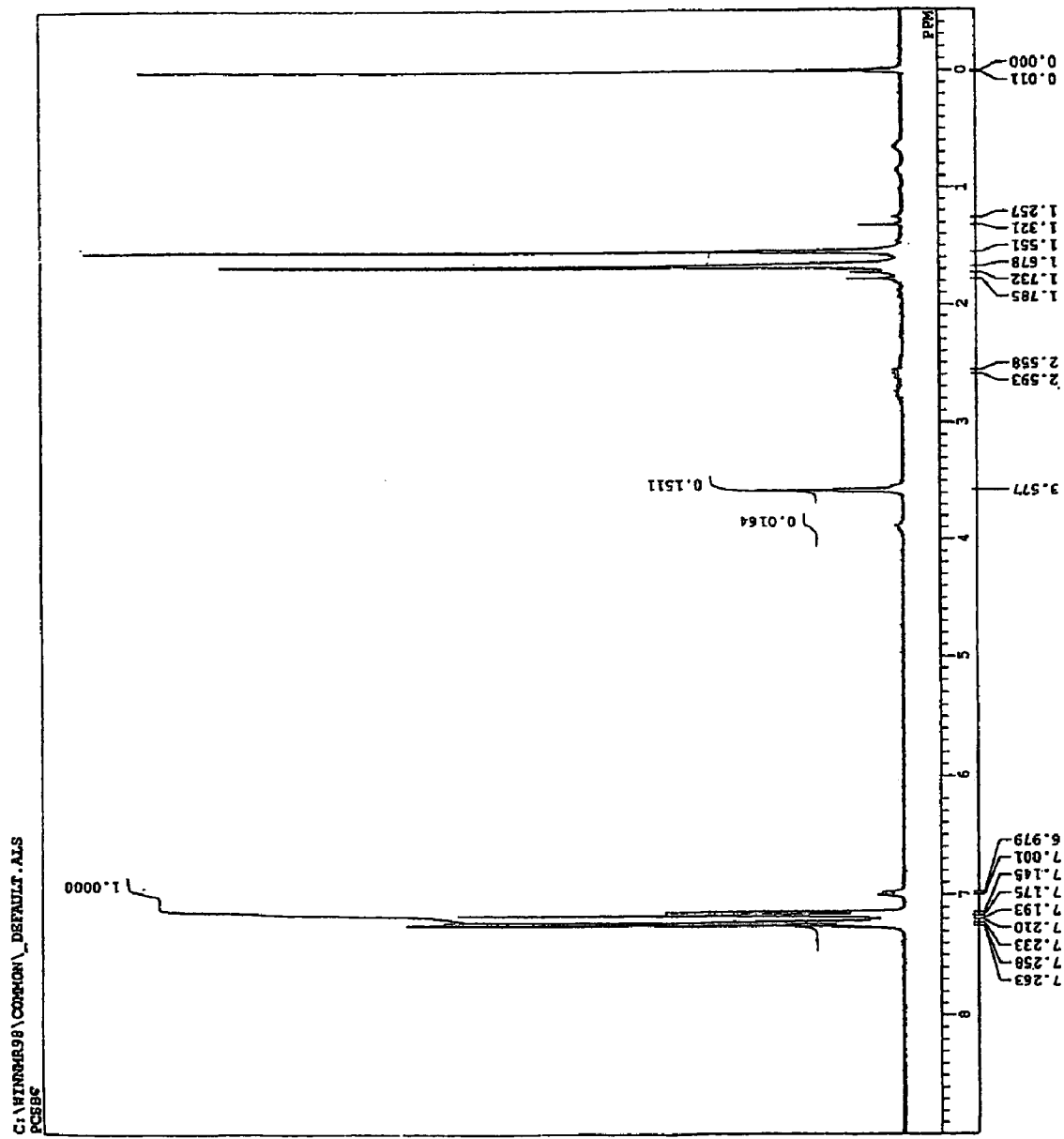
FIG. 3 is a $^1$H-NMR spectrum of a copolymer obtained in Example 3.
Figure 4:
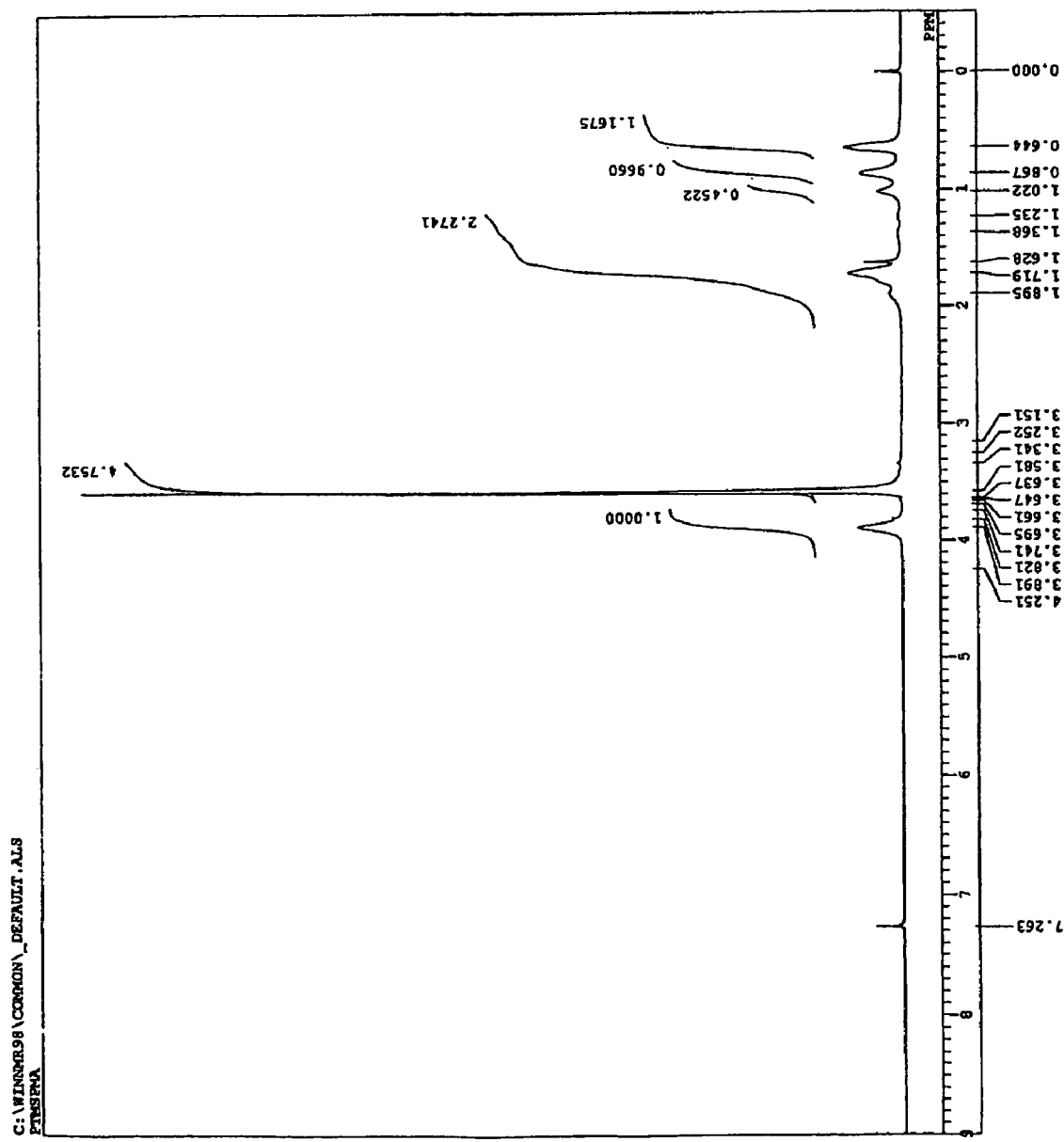
FIG. 4 is a $^1$H-NMR spectrum of poly-3-(trimethoxysilyl) propyl methacrylate obtained in Comparative Example 1.
Figure 5:
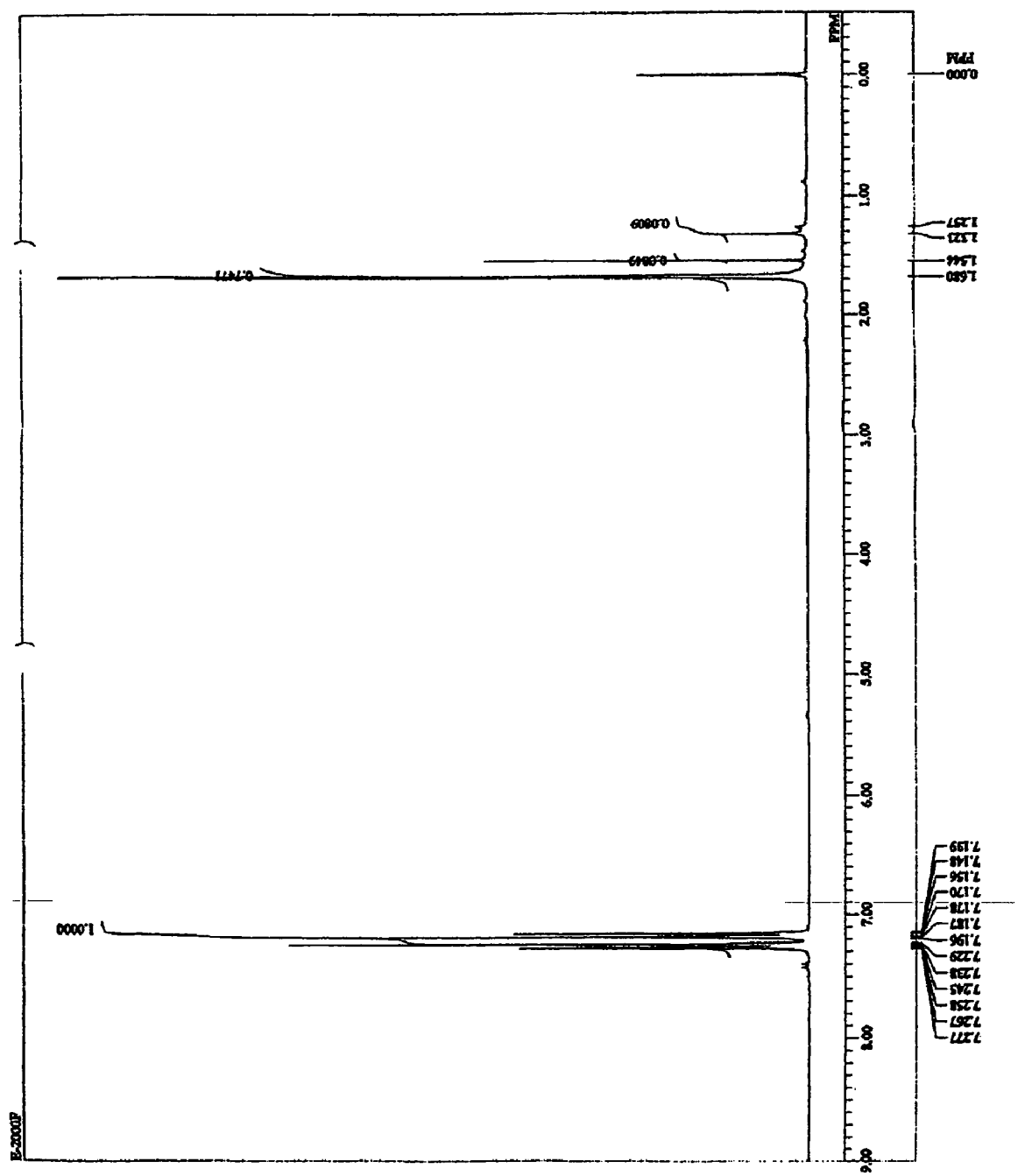
FIG. 5 is a $^1$H-NMR spectrum of commercially available polycarbonate.

FIGS. 1 to 3 show a $^1$H-NMR spectrum of a polymethacrylate-polycarbonate block copolymer having an alkoxysilyl group synthesized in Examples 1 to 3. Also, FIGS. 4 and 5 show a $^1$H-NMR spectrum of poly-3-(trimethoxysilyl)propyl methacrylate synthesized in Comparative Example 1 and polycarbonate (Iupilon E-2000, manufactured by MITSUBISHI ENGINEERING-PLASTICS CORPORATION) respectively.

Figure 6:
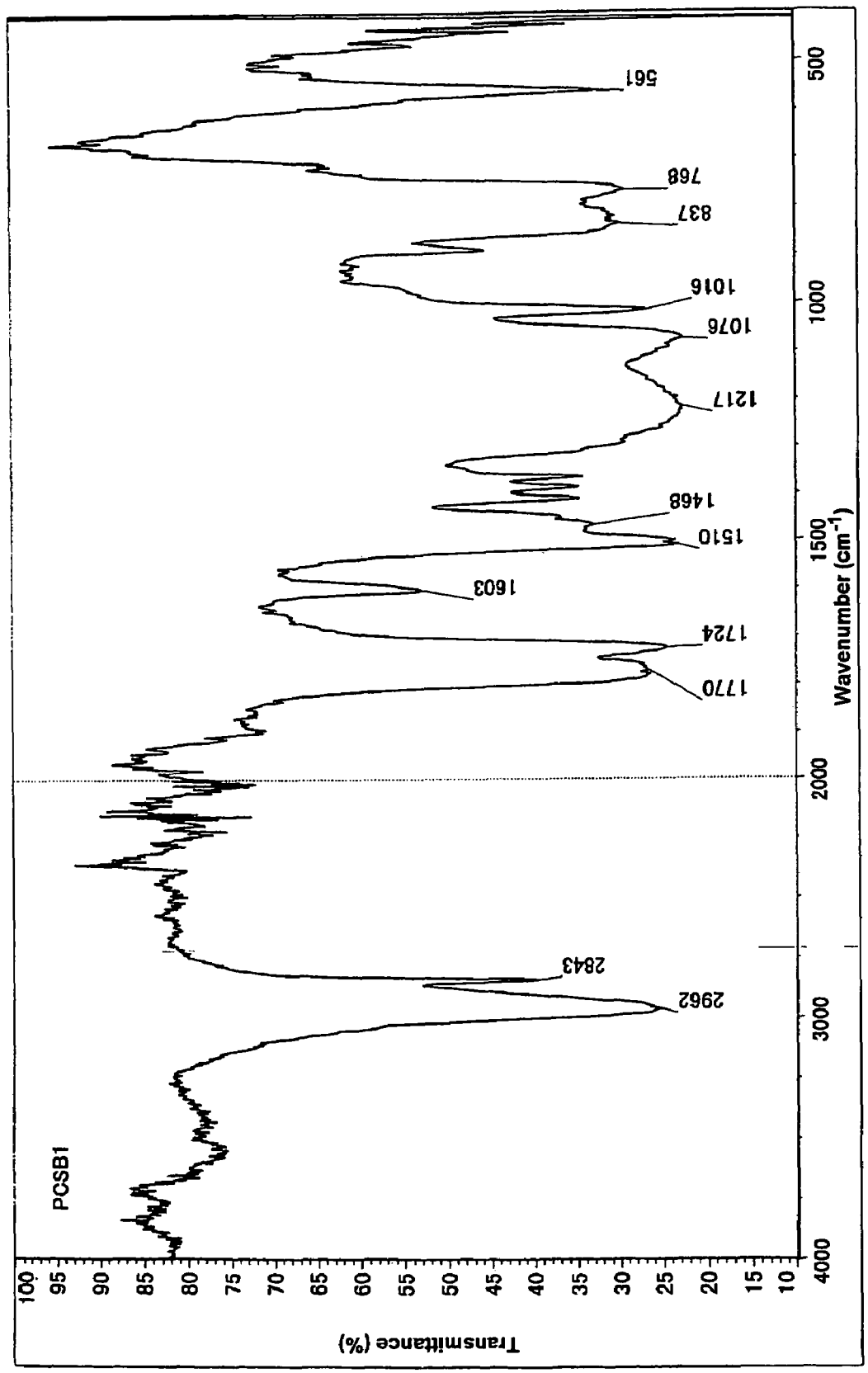
FIG. 6 is an FT-IR spectrum of a copolymer obtained in Example 1.
Figure 7:
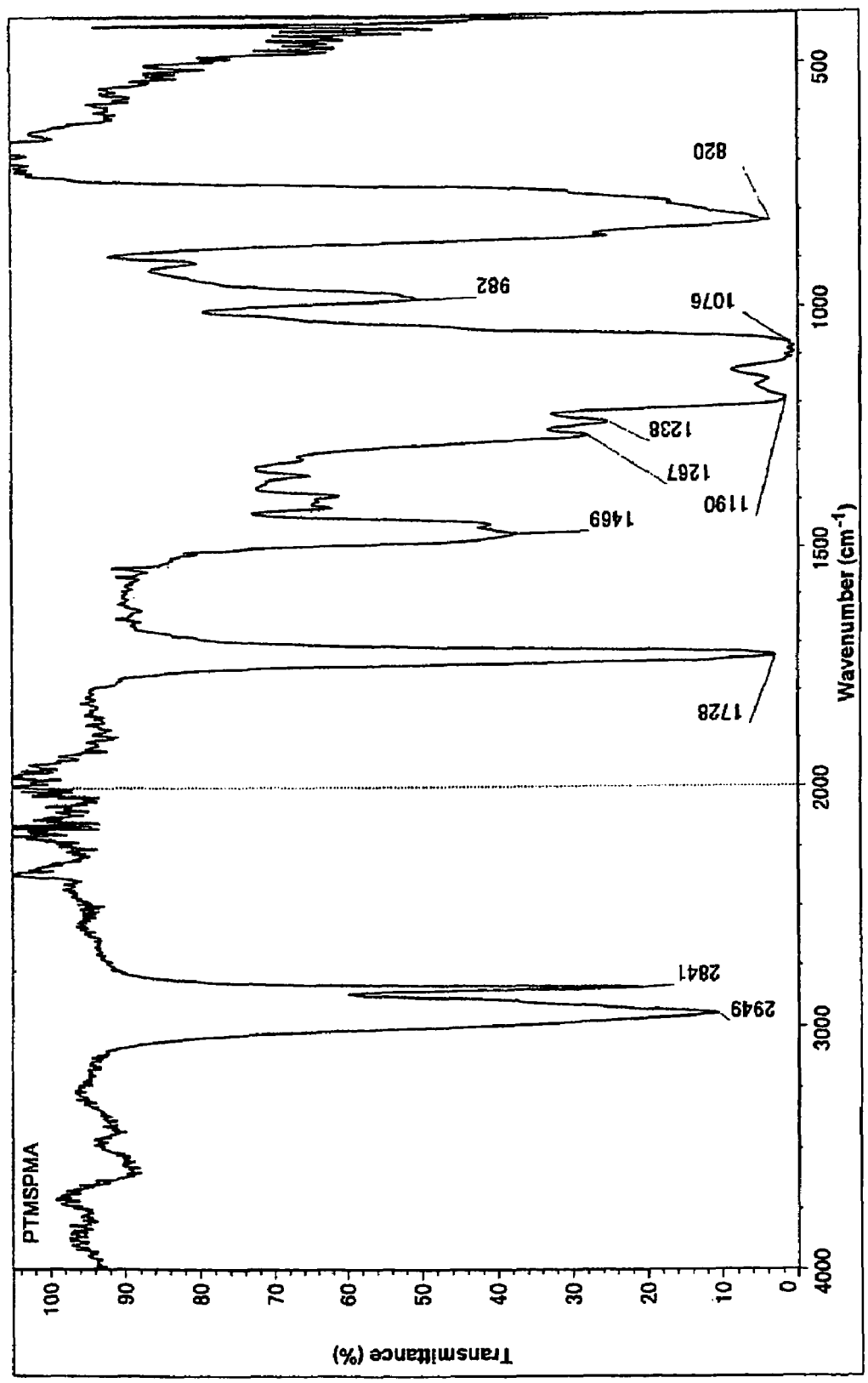
FIG. 7 is an FT-IR spectrum of poly-3-(trimethoxysilyl) propyl methacrylate obtained in Comparative Example 1.
Figure 8:
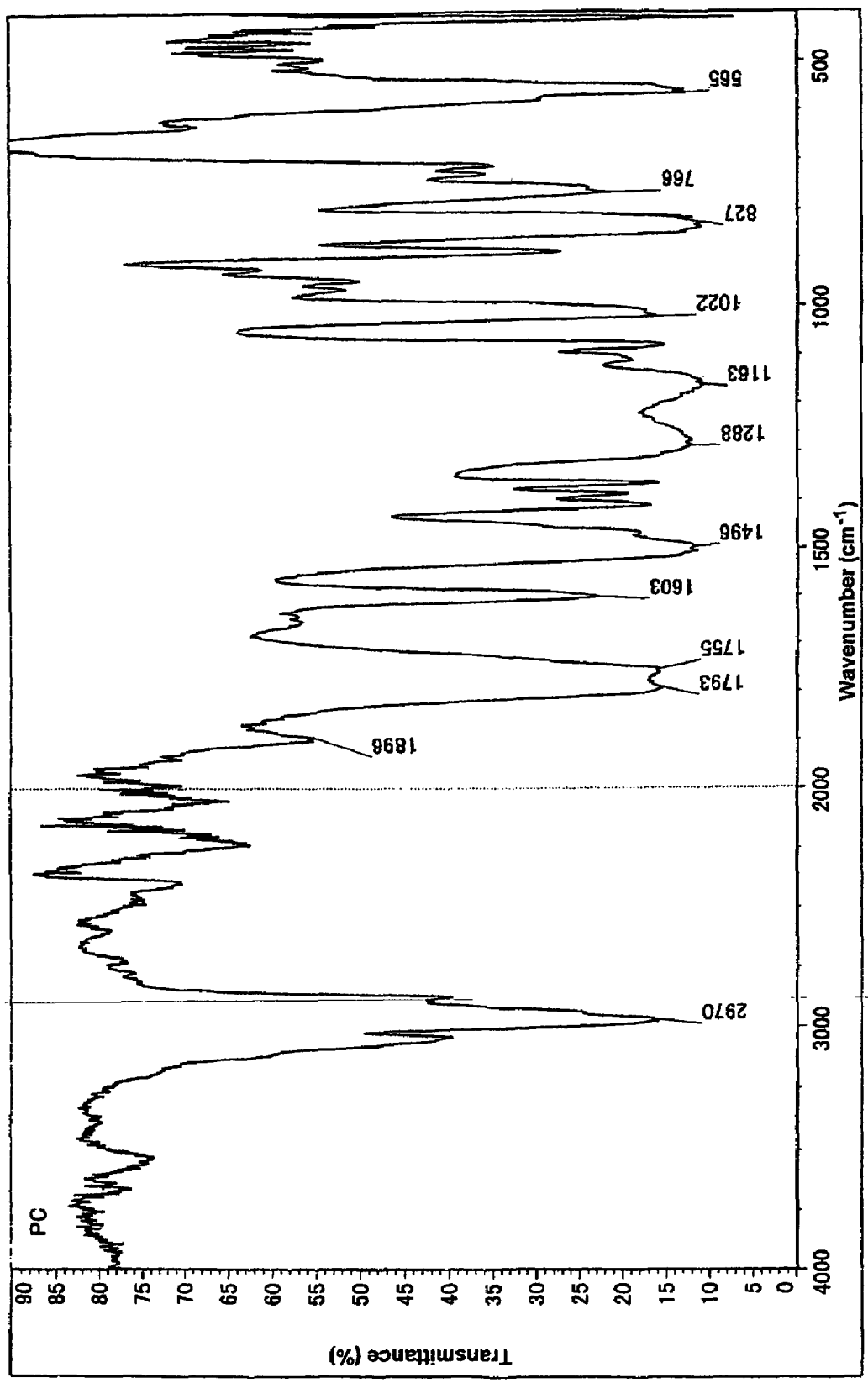
FIG. 8 is an FT-IR spectrum of commercially available polycarbonate.

Also, FIG. 6 shows an FT-IR spectrum of a polymethacrylate-polycarbonate block copolymer having an alkoxysilyl group synthesized in Example 1. Also, FIGS. 7 and 8 show an FT-IR spectrum of poly-3-(trimethoxysilyl)propyl methacrylate synthesized in Comparative Example 1 and polycarbonate (Iupilon E-2000, manufactured by MITSUBISHI ENGINEERING-PLASTICS CORPORATION) respectively.

It was confirmed through the comparison and analysis of these data that a compound synthesized in Examples 1 to 3 was a polymethacrylate-polycarbonate block copolymer having an alkoxysilyl group.

The surface hardness was measured by pencil hardness with the use of a coating film on a glass substrate, which was formed in Examples 7 to 12 and Comparative Example 2. Consequently, It was confirmed that an organic-inorganic hybrid polymeric material produced from an ethylene-based polymer-condensation polymer copolymer having an alkoxysilyl group of the present invention had a favorable surface hardness. Table 1 shows these results together with the results of evaluating cast film external appearances.

TABLE 1

External appearances and surface hardness of hybrid polymeric material

| Examples | External Appearances | | | Surface Hardness | |
| --- | --- | --- | --- | --- | --- |
| | Film Thickness (μm) | Film Form-ability | Trans-parency | Film Thickness (μm) | Surface Hardness |
| Example 7 | 40 | ○ | X | not more than 1 | 5H |
| Example 8 | 40 | ◉ | ◉ | not more than 1 | 4H |
| Example 9 | 40 | ○ | △ | not more than 1 | 2H |
| Example 10 | 40 | ◉ | ◉ | not more than 1 | 3H |
| Example 11 | 30 | ○ | X | not more than 1 | 6H |
| Example 12 | 40 | ○ | △ | not more than 1 | 5H |
| Comparative Example 2 | — | — | — | not more than 1 | HB |

What is claimed is:

1. A copolymer comprising:
a repeating unit represented by the following formula

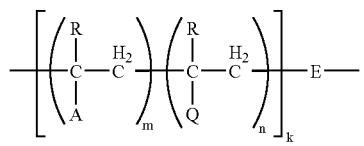

wherein,
A is a reactive silicon-containing group,
R is each independently a hydrogen atom or an alkyl group having 1 to 8 carbon atoms,
Q is a group compatible with the reactive silicon-containing group,
m is an integer of 1 or more, n is an integer of 1 or more, k is an integer of 1 or more, and
E is a structure selected from the group consisting of Formula (1)

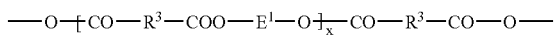

wherein, $E^1$ is a segment of polycarbonate, polyarylate or polysulfone, $R^3$ is each independently an alkylene group having 1 to 10 carbon atoms or an arylene group having 6 to 20 carbon atoms, and x is an integer of 1 or more; and Formula (2)

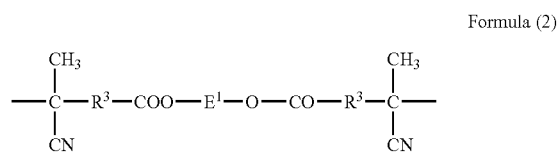

wherein $E^1$ and $R^3$ are the same as defined above.

2. A copolymer according to claim 1, wherein said reactive silicon-containin group is an alkoxysilyl-containing group.

3. A copolymer according to claim 1, wherein said A has a structure represented by the following formula

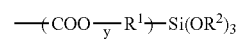

wherein, $R^1$ is an alkylene group having 1 to 10 carbon atoms or an arylene group having 6 to 20 carbon atoms, $R^2$ is an alkyl group having 1 to 10 carbon atoms, and y is 0 or 1.

4. A copolymer according to claim 1, wherein said Q is a hydrogen atom, a carboxyl group, an alkoxycarbonyl group having 1 to 9 carbon atoms, an alkyl group having 1 to 8 carbon atoms, an aryl group having 6 to 20 carbon atoms or a halogen atom.

5. A method of producing a copolymer according to claim 1, comprising the step of radical-polymerizing a monomer mixture containing an unsaturated monomer having a reactive silicon-containing group and an unsaturated monomer compatible with said reactive silicon-containing group by using a macropolymerization initiator having said segment of polycarbonate, polyarylate or polysulfone.

6. A method according to claim 5, wherein said reactive silicon-containing group is an alkoxysilyl-containing group.

7. A method of producing an organic-inorganic hybrid polymeric material, comprising the step of hydrolyzing and polycondensing the copolymer according to claim 1.

* * * * *